United States Patent [19]

Haus et al.

[11] Patent Number: 5,421,872
[45] Date of Patent: Jun. 6, 1995

[54] DYESTUFFS FOR PRINTING INKS

[75] Inventors: Artur Haus, Overath; Rolf Richter, Leverkusen; Martin Michna, Pulheim, all of Germany

[73] Assignee: Bayer Aktiengesellschaft, Leverkusen, Germany

[21] Appl. No.: 286,611

[22] Filed: Aug. 5, 1994

[30] Foreign Application Priority Data

Aug. 13, 1993 [DE] Germany .................. 43 27 257.6

[51] Int. Cl.$^6$ .......................................... C09D 11/02
[52] U.S. Cl. ................................................ 106/22 K
[58] Field of Search ...................... 106/22 K; 534/759

[56] References Cited

U.S. PATENT DOCUMENTS

| | | | |
|---|---|---|---|
| 2,241,795 | 5/1941 | Taube et al. | 534/760 |
| 4,391,639 | 7/1983 | Kobayashi | 106/22 K |
| 4,713,113 | 12/1987 | Shimada et al. | 106/22 K |

FOREIGN PATENT DOCUMENTS

| | | | |
|---|---|---|---|
| 191772 | 11/1983 | Japan | 106/22 K |
| 226072 | 12/1984 | Japan | 106/22 K |

*Primary Examiner*—Helene Klemanski
*Attorney, Agent, or Firm*—Sprung Horn Kramer & Woods

[57] ABSTRACT

The new printing inks, comprising at least one dyestuff of the formula (I)

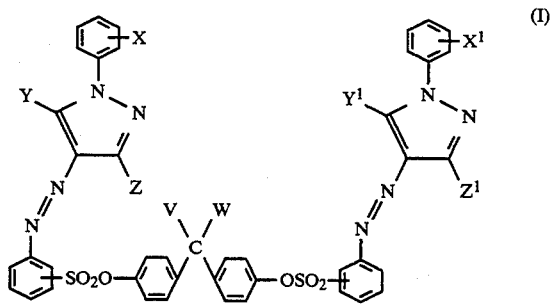

are suitable for printing the most diverse carrier materials, in particular by means of an ink jet recording system.

12 Claims, No Drawings

DYESTUFFS FOR PRINTING INKS

The present invention relates to new printing inks comprising certain diphenylmethane dyestuffs, to a process for the preparation of the printing inks and to a process for printing carrier materials using these printing inks.

The invention thus relates to printing inks comprising

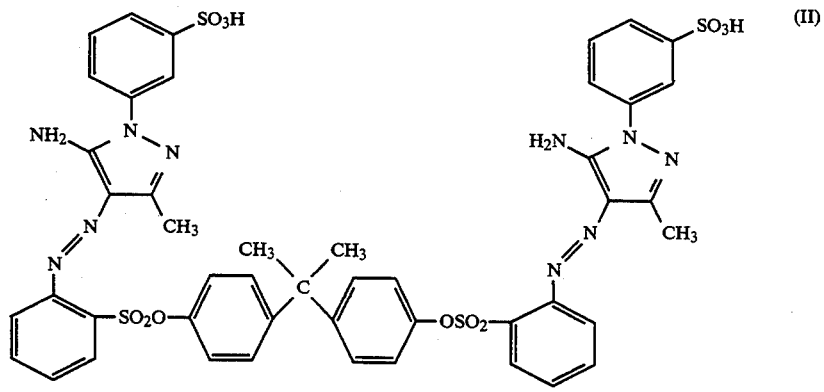

at least one dyestuff which, in the form of the free acid, corresponds to the formula (I)

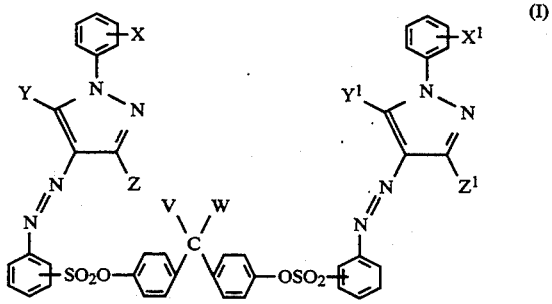

wherein

V and W independently of one another represent $CH_3$ or $C_2H_5$, or

V and W, together with the C atom to which they are bonded, represent a saturated carbocyclic 5- or 6-membered ring, X and $X^1$ independently of one another represent $SO_3H$ or COOH, Y and $Y^1$ independently of one another represent $NH_2$ or OH and Z and $Z^1$ independently of one another represent $CH_3$ or COOH, and wherein the substituents X and $X^1$ independently of one another are each in the ortho-, meta- or para-position relative to the nitrogen atom via which the phenyl ring is bonded, and the —$SO_2O$— groups are each independently of one another in the ortho-, meta- or para-position relative to the azo groups.

Preferred printing inks are those which comprise at least one dyestuff of the formula (I) wherein V and W represent $CH_3$, X and $X^1$ are identical and are both either $SO_3H$ or COOH, Y and $Y^1$ are identical and are both either $NH_2$ or OH and Z and $Z^1$ are identical and are both either $CH_3$ or COOH.

Particularly preferred printing inks are those which comprise at least one dyestuff of the formula (I) wherein V and W represent $CH_3$.

Particularly preferred printing inks are those which comprise the dyestuff of the formula The dyestuffs of the formulae (I) and (II) can be in the form of free acids or in the form of salts, preferably alkali metal salts, such as sodium, potassium or lithium salts, or ammonium or optionally substituted alkylammonium salts.

The dyestuffs of the formula (I) are known and can be prepared in a known manner (compare, for example, German Reichspatent Specification No. 705 780).

To prepare printing inks, at least one dyestuff of the formula (I) is dissolved in water and/or one or more organic solvents, if appropriate with addition of organic and/or inorganic acids or organic and/or inorganic bases. Preferably, a dyestuff of the formula (I) which has first been purified, desalinated and if appropriate concentrated by using membrane processes such as, for example, ultrafiltration, microfiltration, reverse osmosis or a combination thereof is used for preparation of the printing inks according to the invention. The solutions or suspensions obtained by the membrane processes mentioned can be employed directly for preparation of the printing inks according to the invention. However, it is also possible to convert the solutions or suspensions into solid formulations, for example by spray drying, beforehand.

It is also possible for the synthesis solution or suspension obtained on synthesis of the dyestuff to be converted into the printing inks according to the invention without intermediate isolation of the dyestuff, if appropriate with addition of inorganic and/or organic bases or inorganic and/or organic acids and if appropriate with addition of one or more organic solvents and water.

The synthesis solution or suspension is preferably purified and desalinated beforehand by using membrane processes, such as, for example, ultrafiltration, microfiltration and reverse osmosis or a combination thereof.

The printing inks according to the invention preferably comprise 0.1 to 20% by weight, in particular 0.5 to 15% by weight, and especially preferably 0.5 to 10% by weight, of dyestuff of the formula (I), dissolved in water and/or one or more organic solvents. The pH of the printing inks according to the invention can be between pH 5 and 12. The printing inks preferably have a pH of 6 to 10, in particular 7 to 9.5.

The customary organic and/or inorganic acids, such as, for example, hydrochloric acid, lactic acid, paratoluenesulphonic acid, acetic acid or citric acid, or organic and/or inorganic bases, such as alkali metal hydroxides or amines, such as methyldiethanolamine, diethanolamine, triethanolamine or polyglycolamines, such as, for example, the reaction product of ammonia with 6 mol of ethylene oxide, can be employed to adjust the pH. The printing inks according to the invention furthermore can comprise customary buffers, such as, for example, acetates, citrates or phosphonates, in the amounts customary for these.

The printing inks according to the invention moreover can comprise customary additives, such as, for example, surfactants, fungicides, bactericides or binders, such as, for example, acrylate binders, in the amounts customary for these additives.

The printing inks according to the invention in general comprise up to 50% by weight of organic solvent, but preferably less than 30% by weight. Printing inks which comprise 2 to 30% by weight of organic solvent are particularly preferred.

Possible organic solvents are, in particular, water-soluble organic solvents, such as, for example, $C_1-C_4$-alkanols, such as methanol, ethanol, n-propanol, isopropanol, n-butanol, sec-butanol, tert-butanol and isobutanol; pentanediols; amides, such as formamides and dimethylacetamide; ketones or ketone alcohols, such as acetone and diacetone alcohols; esters, such as tetrahydrofuran and dioxane; nitrogen-containing heterocyclic compounds, such as 2-pyrrolidone, N-methyl-pyrrolid-2-one and 1,3-dimethylimidazolid-2-one; polyalkylene glycols, such as polyethylene glycol and polypropylene glycol; alkylene glycols and thioglycols with $C_2-C_6$-alkylene units, such as ethylene glycol, propylene glycol, butylene glycol, triethylene glycol, thiodiglycol, hexylene glycol and diethylene glycol; other polyols, such as glycerol and 1,2,6-hexanetriol; and alkyl ethers and polyalkyl ethers of alcohols, such as 2-methoxyethanol, 2-(2-methoxy-ethoxy) ethanol, 2-(2-ethoxyethoxy)ethanol, 2-methoxy-2-ethoxy-2-ethoxyethanol, 2-[2-(2-methoxyethoxy)ethoxy]ethanol and 2-[2-(2-ethoxyethoxy)ethoxy]ethanol.

Preferred water-soluble organic solvents are glycols and glycol ethers, such as ethylene glycol, diethylene glycol, triethylene glycol and 2-methoxy-2-ethoxy-2-ethoxyethanol; polyethylene glycol having a molecular weight of up to 800; heterocyclic ketones, such as 2-pyrrolidone, N-methylpyrrolid-2-one and 1,3-dimethylimidazolid-2-one; and 1,5-pentanediol. Preferred solvent mixtures are binary mixtures of water and diethylene glycol, water and 2-pyrrolidone, water and 1,5-pentanediol and ternary mixtures of water, diethylene glycol and N-methylpyrrolid-2-one.

The printing inks according to the invention can also contain one or more dyestuffs customary for printing inks, in addition to the dyestuffs of the formula (I) in particular of the formula (II), such as, for example, the dyestuffs Direct Yellow 86 or Acid Yellow 23 listed in the Color Index, which can be used, for example, for shading.

Particularly preferred inks contain a dyestuff mixture comprising 50-99% by weight, in particular 80-99% by weight of a dyestuff of the formula (II) and 1-50% by weight, in particular 1-20% by weight of Direct Yellow 86 or a dyestuff mixture comprising 50-99% by weight, in particular 80-99% by weight of a dyestuff of the formula (II) and 1-50% by weight, in particular 1-20% by weight of Acid Yellow 23.

The printing inks according to the invention are suitable for printing various carrier materials, such as, for example, paper, wood, textiles, plastics or metal.

The printing inks according to the invention are preferably used as a recording liquid for ink jet recording systems. The ink jet recording systems are, for example, ink jet printers, such as thermal jet, bubble jet, piezo-inkjet or valve inkjet. Paper is the preferred recording material for ink jet printers.

The ink jet recording process is known per se. In this process, droplets of a writing liquid are ejected from one or more small jets in a controlled manner onto a carrier material. The individual droplets are combined to form characters or graphical patterns by electronic control. It is necessary for the ink to interact with the carrier material, preferably paper. The ink should penetrate into the paper without spreading too much, since otherwise the print quality suffers. The printed information must dry quickly, and be waterproof and wipeproof. Many inks have some of the properties required at the expense of the other properties. In particular, the resistance of the dyestuffs to water is usually unsatisfactory.

Surprisingly, it has been found that the printing inks according to the invention produce particularly waterproof prints when used in ink jet recording systems. The printing inks according to the invention result in good water-fastnesses on a large number of different papers. Their suitability for a large number of non-coated papers, so-called plain papers, is particularly important. The widely used, largely neutral writing papers which are becoming more widespread may be mentioned in particular here.

The invention furthermore relates to a process for printing carrier materials by means of an ink jet recording system, wherein a printing ink according to the invention is employed as the recording liquid.

The following examples are intended to illustrate the invention but without limiting it.

Unless stated otherwise, percentages and parts in each case relate to the weight.

1. Preparation of the Printing Inks According to the Invention 880 kg of a solution of 50 kg of dyestuff (II) in water with a dry matter content of 7.7% and a chloride content of 0.73% are subjected to ultrafiltration in a commercially available pressure permeation unit. 880 kg of permeate are first drawn off and replaced continuously by 880 kg of demineralized water. The solution is then concentrated to 600 kg of solution by drawing off 280 kg of permeate. This solution is desalinated further by drawing off 1,200 kg of permeate and replacing it continuously with demineralized water. Thereafter, the solution is concentrated by drawing off permeate until the flow has fallen to less than 200 $1 \times m^{-2} \times d^{-1}$. The concentrate which remains is spray-dried and can be processed, by renewed dissolving in water and/or one or more organic solvents, to give a printing ink according to the invention which is outstandingly suitable for the ink jet printing process.

2. Determination of the Water-Fastness General Information on the Experiments

The printing inks of Examples 1 to 3 and the comparison inks of Examples 4 to 6 were prepared by dissolving the dyestuffs mentioned in the solvents mentioned.

The dyestuff solutions were then each forced through a 0.2 μm (0.0002 mm) filter and introduced into cleaned cartridges type 51608A from Hewlett Packard for a Deskjet 500 ®. Agfa copying paper type 701 ® was printed over the entire surface on the Deskjet 500 ®.

The comparison inks of Examples 4 to 6 comprise yellow dyestuffs customary for ink jet printers. The comparison inks of Examples 7 and 8 are ready-made commercial products which are employed directly without filtration.

The prints were stored in a room climate for 24 hours and then in completely desalinated water for 24 hours. The paper was then removed from the waterbath and dried. The depth of colour on the original print with the staining of the paper which remained after storage under water was evaluated.

The depth of colour on the paper was determined by means of a Macbeth Filter Densitometer and stated as the optical density. The optical density was evaluated here at the most sensitive light wavelength. In the case of yellow dyestuffs, this is the blue filter. High values for the optical density mean deep coloration of the substrate.

EXAMPLE 1

Printing ink according to the invention:
90 parts of completely desalinated water, 10 parts of diethylene glycol and 1.5 parts of dyestuff (II)

EXAMPLE 2

Printing ink according to the invention:
92 parts of completely desalinated water, 8 parts of 1,5-pentanediol and 1.5 parts of dyestuff (II)

EXAMPLE 3

Printing ink according to the invention:
93 parts of completely desalinated water, 7 parts of 2-pyrrolidone and 1.5 parts of dyestuff (II)

EXAMPLE 4

Comparison ink:
90 parts of completely desalinated water, 10 parts of diethylene glycol, 0.75 part of Direct Yellow 86 and 0.75 part of Acid Yellow 23

EXAMPLE 5

Comparison ink:
92 parts of completely desalinated water, 8 parts of 1,5-pentanediol, 0.75 part of Direct Yellow 86 and 0.75 part of Acid Yellow 23

EXAMPLE 6

Comparison ink:
90 parts of completely desalinated water, 10 parts of diethylene glycol and 1.5% of Acid Yellow 23

EXAMPLE 7

Comparison ink:
Commercially available ink comprising the dyestuff Direct Yellow 86

EXAMPLE 8

Comparison ink:
Commercially available ink comprising the dyestuffs Direct Yellow 86 and Acid Yellow 23

The results of the determination of the water-fastness for Examples 1 to 8 are summarized in the following table.

| Example No. | OD* of the original print on paper | OD of the original print after storage in water for 24 hours | OD in % after storage in water for 24 hours |
| --- | --- | --- | --- |
| 1 | 0.72 | 0.71 | 98% |
| 2 | 0.67 | 0.63 | 94% |
| 3 | 0.69 | 0.67 | 96% |
| 4 | 0.97 | 0.43 | 44% |
| 5 | 0.88 | 0.39 | 44% |
| 6 | 0.98 | 0.21 | 21% |
| 7 | 1.14 | 0.75 | 66% |
| 8 | 0.76 | 0.41 | 54% |

*OD = optical density, measured with a blue filter

EXAMPLE 9

90 parts of completely desalinated water, 10 parts of diethylene glycol, 2 parts of dyestuff (II) and 1 part of Direct Yellow 86.

EXAMPLE 10

90 parts of completely desalinated water, 10 parts of 1.5-pentanediol, 2 parts of Dyestuff (II) and 0.25 parts of Direct Yellow 86.

EXAMPLE 11

92 parts of completely desalinated water, 10 parts 1.5-pentanediol, 2 parts of Dyestuff (II) and 2 parts of Acid Yellow 23.

EXAMPLE 12

93 parts of completely desalinated water, 10 parts of 1.5-pentanediol, 1 part of Dyestuff (II) and 0.25 parts of Acid Yellow 23.

EXAMPLE 13

90 parts of completely desalinated water, 10 parts of 1.5-pentanediol, 2 parts of Dyestuff (II) and 0.25 parts of Direct Yellow 86.

EXAMPLE 14

90 parts of completely desalinated water, 1 part of i-propanol, 6 parts of tri-ethylene glycol, 4 parts of 1,2,6-hexanetriol, 3 parts of Dyestuff (II) and 0.3 parts of Direct Yellow 86.

We claim:

1. Printing ink, which comprises at least one dyestuff which, in the form of the free acid, corresponds to the formula (I)

wherein

V and W independently of one another represent $CH_3$ or $C_2H_5$, or

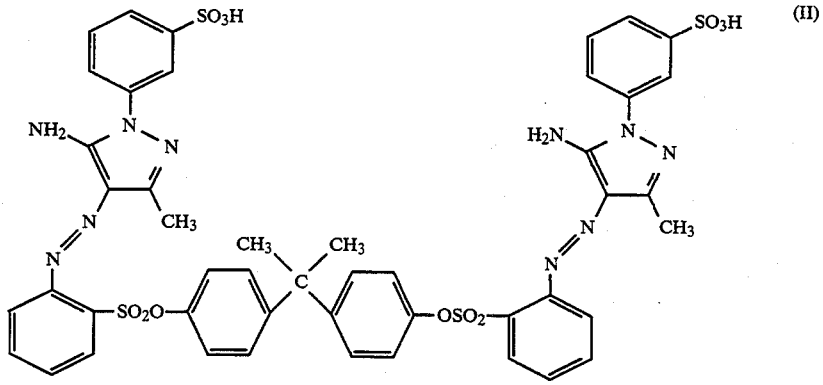

V and W, together with the C atom to which they are bonded, represent a saturated carbocyclic 5- or 6-membered ring, X and $X^1$ independently of one another represent $SO_3H$ or COOH, Y and $Y^1$ independently of one another represent $NH_2$ or OH and Z and $Z^1$ independently of one another represent $CH_3$ or COOH, and wherein the substituents X and $X^1$ independently of one another are each in the ortho-, meta- or para-position relative to the nitrogen atom via which the phenyl ring is bonded, and the —$SO_2O$ groups are each independently of one another in the ortho-, meta- or para-position relative to the azo groups.

2. Printing ink according to claim 1, which comprises at least one dyestuff which, in the form of the free acid, corresponds to the formula (I) wherein V and W represent $CH_3$, X and $X^1$ are identical and are both either $SO_3H$ or COOH, Y and $Y^1$ are identical and are both either $NH_2$ or OH and Z and $Z^1$ are identical and are both either $CH_3$ or COOH.

3. Printing ink according to claim 1, which comprises a dyestuff which, in the form of the free acid, corresponds to the formula 4. Printing ink according to claim 1, which comprises 0.1 to 20% by weight of dyestuff.

5. Printing ink according to claim 1, which has a pH of between 5 and 12.

6. Printing ink according to claim 1, which comprises 2 to 30% by weight of organic water-soluble solvent.

7. Printing ink according to claim 1, wherein the dyestuff of the formula (I) has been purified, desalinated and optionally concentrated beforehand by using a membrane process.

8. Process for the preparation of a printing ink according to claim 1, wherein at least one dyestuff of the formula (I), which has been purified, desalinated and optionally concentrated beforehand, is dissolved in water and/or one or more organic solvents.

9. Process for printing carrier materials with a recording liquid comprising ejecting droplets of the recording liquid from one or more small jets in a controlled manner onto a carrier material wherein the recording liquid is a printing ink according to claim 1.

10. Process according to claim 9, wherein the carrier material is paper, wood, textiles, plastic or metal.

11. Printing ink containing a dyestuff according to claim 1 and Direct Yellow 86 or Acid Yellow 23.

12. Printing ink containing a dyestuff according to claim 3 and Direct Yellow 86 or Acid Yellow 23.

* * * * *